(12) United States Patent
Ballu (10) Patent No.: US 9,795,125 B2
(45) Date of Patent: Oct. 24, 2017

(54) DIRECT-INJECTION SPRAYING DEVICE FOR A VEHICLE, IN PARTICULAR AN AGRICULTURAL VEHICLE, AND VEHICLE PROVIDED WITH SUCH A DEVICE

(71) Applicant: EXEL INDUSTRIES, Epernay (FR)

(72) Inventor: Patrick Jean Marie Ballu, Reims (FR)

(73) Assignee: EXEL INDUSTRIES, Epernay (FR)

( * ) Notice: Subject to any disclaimer, the term of this patent is extended or adjusted under 35 U.S.C. 154(b) by 20 days.

(21) Appl. No.: 13/752,683

(22) Filed: Jan. 29, 2013

(65) Prior Publication Data
US 2013/0140376 A1    Jun. 6, 2013

Related U.S. Application Data

(63) Continuation-in-part of application No. PCT/FR2011/051449, filed on Jun. 23, 2011.

(51) Int. Cl.
*A01M 7/00*    (2006.01)
(52) U.S. Cl.
CPC .......... *A01M 7/005* (2013.01); *A01M 7/0092* (2013.01)
(58) Field of Classification Search
CPC ...... B05B 7/26; B05B 7/2486; A01M 7/0089; A01M 7/0092; A01M 7/005; B01F 2005/0017; B01F 5/0062
USPC ....... 239/104, 124, 127, 155, 159, 170, 303, 239/304, 305, 307, 310, 337, 398, 399, 239/407, 413, 417.5, 432, 566; 366/165.1, 165.2, 165.4; 137/896
See application file for complete search history.

(56) References Cited

U.S. PATENT DOCUMENTS

| 3,348,774 | A | * | 10/1967 | Wiggins | 239/70 |
| 4,121,767 | A | * | 10/1978 | Jensen | 239/71 |
| 4,358,054 | A | * | 11/1982 | Ehrat | 239/155 |
| 4,415,275 | A | * | 11/1983 | Dietrich | 366/165.1 |
| 5,310,113 | A | * | 5/1994 | Cowgur | A01M 7/0092 239/10 |
| 5,314,120 | A | * | 5/1994 | Nau et al. | 239/310 |

(Continued)

FOREIGN PATENT DOCUMENTS

EP    0385926 A1    9/1990
EP    1378293 A1 *  1/2004 ............... B05B 7/32
(Continued)

OTHER PUBLICATIONS

International Search Report dated Oct. 17, 2011 re: PCT/FR2011/051449; pp. 3; citing: U.S. Pat. No. 4,121,767 A, EP 0 385 926 A1, WO 01/87493 A1, EP 1 378 293 A1, FR 2 920 101 A1 and GB 670 101 A.

*Primary Examiner* — Christopher Kim
*Assistant Examiner* — Cody Lieuwen
(74) *Attorney, Agent, or Firm* — Cantor Colburn LLP (57) ABSTRACT

The direct-injection spraying device, in particular for an agricultural vehicle, according to the invention includes a main tank, at least one spray boom, and a circuit connecting the tank to the boom. comprises:
The circuit includes a main pump and a bypass for controlling the flow rate in the boom in accordance with the traveling speed of the vehicle.
At least one active substance store is connected to the circuit by a metering pump.
The device further includes a cyclone mixer capable of receiving, as input, the liquid from the main tank, and the pressurized liquids coming from the active substance store, and capable of eliminating the boom as output.

14 Claims, 7 Drawing Sheets

(56) References Cited

U.S. PATENT DOCUMENTS

| | | | |
|---|---|---|---|
| 6,318,645 B1* | 11/2001 | Robinson | 239/155 |
| 6,409,375 B1* | 6/2002 | Knight | 366/136 |
| 2006/0086296 A1* | 4/2006 | Wichmann | 111/127 |

FOREIGN PATENT DOCUMENTS

| | | | |
|---|---|---|---|
| FR | 2920101 A1 | 2/2009 |
| GB | 670101 A | 4/1952 |
| WO | 0187493 A1 | 11/2001 |

* cited by examiner

DIRECT-INJECTION SPRAYING DEVICE FOR A VEHICLE, IN PARTICULAR AN AGRICULTURAL VEHICLE, AND VEHICLE PROVIDED WITH SUCH A DEVICE

CROSS REFERENCE TO RELATED APPLICATIONS

This is a continuation of International Patent Application No. PCT/FR2011/051449 filed on 23 Jun. 2011 which claims priority to French Patent Application No. 1056262 filed on 29 Jul. 2010. This application is further related to and claims the benefit of French Patent Application No. 1260503 filed on 6 Nov. 2012. All of said applications are herein incorporated by reference in their entirety.

TECHNICAL FIELD

The present invention relates to a direct-injection spraying device, in particular for an agricultural vehicle, and a vehicle equipped with such a device.

BRIEF DESCRIPTION OF RELATED ART

Direct-injection spraying devices, in particular for agricultural vehicles, of this type comprise:
 a main tank,
 at least one spray boom,
 a circuit connecting said tank to said boom, said circuit comprising a main pump and a bypass for controlling the flow rate in said boom in accordance with the traveling speed of said vehicle, and
 at least one active substance store connected to said circuit by a metering pump.

Such a direct injection device makes it possible to inject the active substances downstream of the main tank, and thereby eliminate the constraints of rinsing that tank with significant volumes of clean water, at the end of spraying.

In addition to making it possible to save considerable amounts of rinse water, this also makes it possible to change active substances quickly.

Such a change may be done either by manually changing active substance stores, or by providing several stores of active substances installed on the vehicle and connected to the spraying circuit by a valve system.

In this way, it is possible to perform customized spraying, also called "parceled" spraying.

The pressure generally remains constant, and the quantity of active substance injected by the metering pump into the circuit is controlled to approach a surface quantity of sprayed liquid that is substantially independent of the speed of the vehicle (the term "Rate Proportional to Advance," or RPA, is often used).

Such a spraying device nevertheless has certain major drawbacks, which have not allowed it to succeed fully:
 when the agricultural vehicle slows down, the injection rate of active substance into the liquid to be sprayed decreases, and the liquid with a smaller amount of active substance takes a certain amount of time to reach all of the nozzles of the boom(s): during that period, the plants are overdosed with active substance;
 conversely, when the agricultural vehicle accelerates, the injection rate of active substance into the liquid to be sprayed increases, and the liquid with a higher quantity of active substance takes time to reach all the nozzles of the boom(s): during that period, the plants are under-dosed with active substance;
 in the event of a short, temporary slowdown, these two phenomena are asynchronous and their negative effects are accumulated.

It has also been noted that the over- or under-dosing phenomena were irregular and asynchronous, depending on the distance of each nozzle from the point of incorporation of the active substance into the liquid to be sprayed (in particular in very long booms).

BRIEF SUMMARY

The present invention in particular aims to resolve these drawbacks.

This aim of the invention is achieved with a direct-injection spraying device, in particular for an agricultural vehicle, of the type comprising:
 a main tank,
 at least one spray boom,
 at least one active substance store,
 a cyclone mixer whereof a first (e.g., upper) portion comprises at least first and second substantially tangential inlet ports, and whereof a second (e.g., lower) portion comprises an outlet port,
 and a fluid circuit comprising:
 a main pump,
 at least one inlet duct connecting said tank to said first port,
 at least one bypass controlling the flow rate in said boom in accordance with the traveling speed of said vehicle, the bypass being connected to a regulating valve,
 at least one metering pump inserted between said store of active substance and said second port, and
 at least one outlet duct connecting said outlet port to said boom.

Owing to the cyclone mixer, it is possible to produce a completely homogenous mixture of the active substance(s) with the sprayed liquid (generally water or slurry) very quickly.

Furthermore, such a mixer has an extremely simple and small design by definition, such that it can be incorporated into a traditional spraying facility very easily.

Due to its small size, it is in particular possible to arrange the cyclone mixer, the pumps, the RPA regulating valve and the flow regulating bypass very close to each other: in this way, the length of the ducts and dead spaces of the entire circuit is reduced.

Furthermore, the quantity of active substance injected by each metering pump being proportional to the quantity of liquid coming from the main tank C (in particular measured by a flow meter), i.e., to the quantity actually sprayed through only the open nozzles, everything appears to happen as if one had sucked the pre-metered liquid directly from said tank C, as is the case in a traditional RPA sprayer.

Furthermore, relative to the previous direct-injection devices, said new device does not suffer any of the drawbacks of over- or under-dosing generated, as explained above, by the inertia of the duct lengths, during changes in the speed of the vehicle.

According to other optional features of the device according to the invention:
 the bypass is connected to one of the inlet ports, and the main pump communicates with the outlet port;
 the device also comprises a circulation return for returning the boom toward the mixer, and the mixer also includes a third inlet port capable of receiving the pressurized liquid coming from that return: such a return (which is typically referred to as continuous or semi-continuous circulation) makes it possible to avoid the risks of sedimentation or clogging of the nozzles of the spray booms, and contributes to the complete homogenization of the active substances inside the mixer;

the device can operate according to at least two speed ranges:
  a relatively slow range, in which the flow rate of the active substance coming from the active substance store is reduced relative to the liquid flow rate coming from the main tank, and
  a relatively fast range, in which the flow rate of active substance coming from the active substance store is increased relative to the flow rate of liquid coming from the main tank;

the device comprises a plurality of active substance stores connected to the circuit by respective metering pumps: in this way, it is possible to spray the active substances in combination or one after the other, depending on the needs of the parcels traveled by the vehicle;

the tank is associated with a flow meter measuring the quantity of liquid sucked into the main tank and capable of allowing the metering pumps to be driven accordingly;

the device comprises at least one timing means for timing the spraying, activated in particular upon a change in the metering by the metering pumps so as to ensure a propagation of the new dose to the entire circuit before spraying, the device comprises a rinse can that is connected to the circuit by a main rinse valve arranged between the main tank and the mixer: this can makes it possible to rinse this circuit after a spraying run;

the rinse can is also connected to secondary rinsing valves arranged between the active substance stores and the metering pumps: this rinse can thus makes it possible to rinse the ducts connecting the stores to the mixer, for example when one wishes to change the active substance stores;

the device also comprises an incorporating system, connected on the one hand to a general valve arranged between the main pump and the bypass, and on the other hand the main tank: such an incorporating device, known in itself, in particular makes it possible to incorporate powdered products into the liquid (generally water) located inside the main tank;

the main pump is inserted between the main tank and the first inlet port, and the regulating valve is inserted between the main pump and the first inlet port;

the outlet port is oriented substantially tangentially, in particular in an outlet direction of the cyclone;

the outlet port is oriented in a substantially coaxial direction substantially parallel to a longitudinal axis of the mixer;

this mixer assumes a shape chosen from the group comprising cylinders, cones and spheres: these shapes are particularly simple to produce;

the mixer comprises at least one inner lip arranged between its first and second (upper and lower) portions: such a lip contributes to preventing the mixture from going directly from the inlet ports to the outlet port, which would risk producing insufficient homogenization;

the mixer comprises baffles or inner flaps able to favor rapid homogenization of the various entering liquids.

The present invention also relates to an agricultural vehicle, remarkable in that it is equipped with a spraying device according to the preceding.

BRIEF DESCRIPTION OF THE DRAWINGS

Other features and advantages of the present invention will appear in light of the following description, and upon examining the appended figures, in which.

DETAILED DESCRIPTION

In all of FIGS. 3 to 7, the active parts of the circuit, i.e., the ducts in which the pressurized liquids actually circulate, are shown using thick lines, accompanied by arrows.

In all of these figures, identical or similar references designate identical or similar members or sets of members.

The spraying device that will be described at this time is designed to be installed on an agricultural vehicle for spraying phytosanitary products on fields of plants.

Figure 1:
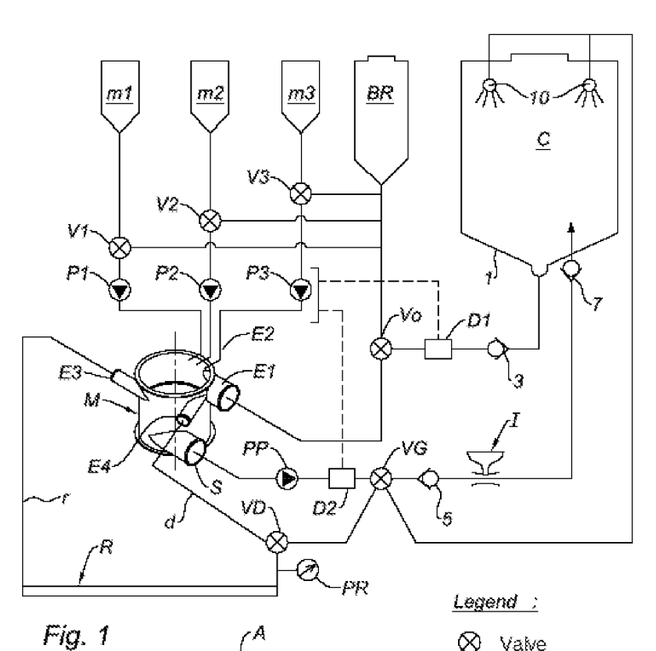
FIG. 1 is a diagrammatic overview of a direct-injection spraying device according to the invention, stopped; a legend indicates the nature of the various elements of that device.

FIG. 1 shows that the device comprises a main tank C, designed to receive clean water or another mixture, such as liquid fertilizer or a pre-metered slurry for treating plants, making it possible to use the sprayer traditionally, i.e., without direct incorporation (case of liquid fertilizers).

The bottom 1 of said tank C cooperates with a check valve 3, a flow meter D1, and a main rinse valve V0.

Said main rinse valve V0 in turn communicates on the one hand with a rinse can R, and on the other hand with the first upper inlet E1 of a cyclone mixing device M that will be described later.

Several active substance stores, three in the illustrated example (m1, m2, m3), communicate with three respective metering valves V1, V2, V3, which in turn communicate on the one hand with the can BR and on the other hand with three metering pumps P1, P2, P3, respectively.

These three metering pumps P1, P2, P3 in turn communicate with three grouped inlet ports E2 in the mixer M, slightly offset in the downstream direction (for example, by substantially one quarter of a revolution) from the inlet port E1, potentially protruding inside the mixer M, so as to directly penetrate the heart of the inlet flow E1.

The second (lower, in this case) portion of the cyclone mixer M also includes an outlet port S with an axis either substantially tangent to the outbound direction of rotation (here trigonometric) of the cyclone, or perpendicular to the axis A of the mixer M (see detail FIG. 2), or coaxial or parallel to the axis, so as to optimize the homogenization (alternative shown in FIG. 2b), and which communicates with the main pump PP, which in turn is connected to a flow meter D2 and the general valve VG.

The general valve VG is in turn connected to a flow regulating valve VD, which itself is connected to at least one spray boom R provided with at least one return duct toward an inlet port E3 arranged in a first (in this case, upper) portion of the mixer M, and offset by a quarter revolution relative to the inlet ports E2.

The regulating valve VD is on the other hand connected to a bypass duct d, which in turn is connected to an (upper) inlet port E4, offset by approximately one additional quarter revolution relative to the (upper) inlet port E3.

A pressure measuring device PR makes it possible to determine the pressure of the liquid located in the spray boom R.

The general valve VG is also connected to an incorporating device I, which in turn is connected to the tank C, check valves 5, 7 being positioned upstream and downstream of said incorporating device I, as shown in FIG. 1.

The valves V0 and VG may of course be replaced by several specialized valves.

The general valve VG is also connected to a rinsing device 9 (of the rotary jet type, for example) of the tank C.

Figure 2:
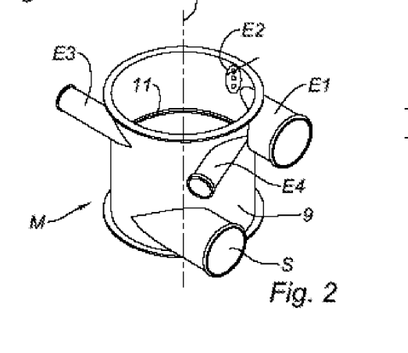
FIG. 2 is an isometric perspective view of the cyclone mixer (M) of FIG. 1, on a larger scale and with a tangential outlet.

FIG. 2 more specifically shows that the cyclone mixer M may be made very simply using a cylinder 9 including the inlet ports E1, E2, E3, E4 in its first (upper) portion, and the outlet port S in its second (lower) portion, the terms "upper" and "lower" of course being understood relative to the vertical once the mixer M is installed on for the agricultural vehicle, with the understanding that these two terms of positions may be inverted.

As already previously indicated, the (upper) inlet ports are preferably offset by a quarter revolution relative to one another; while the inlet port E1, E3, E4 and the outlet port S are arranged substantially tangentially, in the direction of the inner flow (here trigonometric) relative to the cylinder 9 making up the mixer body M. On the contrary, the inlet ports E2 for active substances m1, m2, m3 are preferably oriented in a direction substantially perpendicular to the axis A of the mixer M, and substantially protruding inward, so as to penetrate the heart of the flow entering through E1; lastly, a lip 11 is provided, the function of which will be explained below.

The mixer M can be made from metal or a plastic, and its dimensions may typically be approximately 20 cm high and in diameter.

This mixer does not need to be particularly strong, as it does not undergo any significant pressure, except from the column of liquid formed by the tank C.

In all of the appended figures, this mixer M has been shown with an open upper portion for explanatory purposes; it must of course be understood that during operation, this upper portion and a lower portion of the mixer are closed.

We will now describe the operation and advantages of the aforementioned spraying device, in different operating phases.

The set of adjustments that will be indicated can be done manually, although it is clearly preferable to control them automatically, using a centralized electronic monitoring system.

Figures 2B, 3:
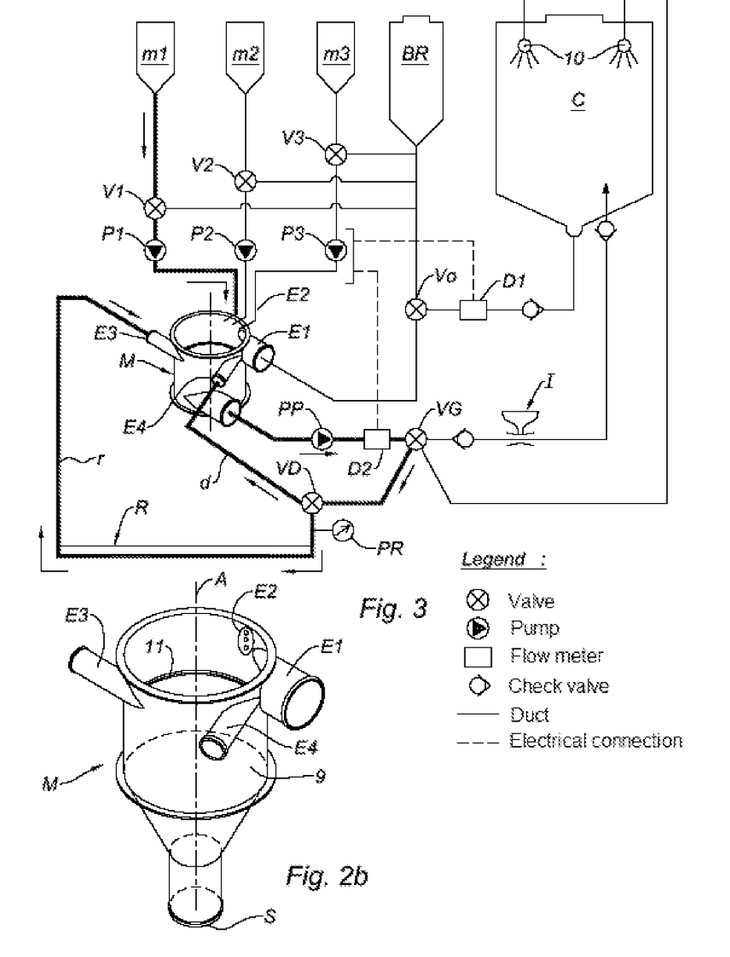
FIG. 2b is an isometric perspective view of the cyclone mixer (M) of FIG. 1, but with a coaxial outlet.
FIGS. 3 to 7 show the device of FIG. 1 in different operating states, i.e.: in an initial phase for metering an active substance (FIG. 3), a spraying phase (FIG. 4), an incorporating phase (FIG. 5), a phase for rinsing the duct introducing the active substance and the spray boom (FIG. 6), and a phase for rinsing the main tank (FIG. 7)

One alternative of the mixer (M) shown in FIG. 2b shows a mixer equipped with an outlet coaxial to an axis A of the mixer.

FIG. 3 shows the device according to the invention in a phase for incorporating an active substance m1, in the entire circulation circuit (the dead space of which is known by construction), prior to a spraying phase.

During this phase, the valve V1 is placed such that the store of active substance m1 communicates with the metering pump P1.

This pump P1 is operated so as to send the active substance m1 inside the mixer M, through one of the inlet ports E2.

The main valve V0 is placed so as to prevent the arrival of liquid coming from the tank C or the can BR inside the mixer M.

The general valve VG is placed so to channel the liquid coming from the mixer M, by means of the pump PP, toward the regulating valve VD.

The regulating valve VD is placed in an intermediate position between the bypass duct d and the ramp R; the spray nozzles are closed.

The main pump PP is actuated, which results in mixing the active substance m1 arriving through the inlet E2 with other liquids arriving on the one hand from the bypass duct d, and on the other hand from the return duct r.

Due to the tangent orientation of the inlet ports E3 and E4, the active substance arriving through the inlet port E2 is rotated by the flow of said two inlets E3 and E4, like a cyclone inside the cylinder 9, and gradually descends toward the outlet port S.

The presence of at least one inner lip 11 prevents the mixture thus formed from leaving the cylinder 9 too quickly: in this way, it is possible to obtain optimal and rapid homogenization over the entire circulation circuit.

The length of this incorporation and metering phase for the substance m1 may be determined from the knowledge of the volume of the circuit indicated in thick lines in FIG. 3: once this length is reached, the secondary valve V1 is closed and the metering pump P1 is stopped, while continuing to rotate the pump PP, so as to complete the homogenization of all of the liquid circulating in that circuit.

Alternatively, a flow meter D2 can be used to measure the volume of liquid having circulated during that prior phase, and compare it to the volume (known by construction) of the circuit portion indicated in thick lines, so as to close the valve V1 and its pump P1 automatically once the correct metering of said circuit is achieved. As above, to ensure complete homogenization of all of the liquid circulating in that circuit, the pump PP is allowed to rotate for some time.

The cyclone mixer M makes it possible to incorporate the active substance m1 into the spraying circuit very quickly, having noted that the description above is of course applicable to the other active substance stores m2, m3, . . . , all of these active substances being able to be incorporated each in turn, or partially or completely combined, depending on the nature of the needs of the plant parcels to be treated.

Figure 4:
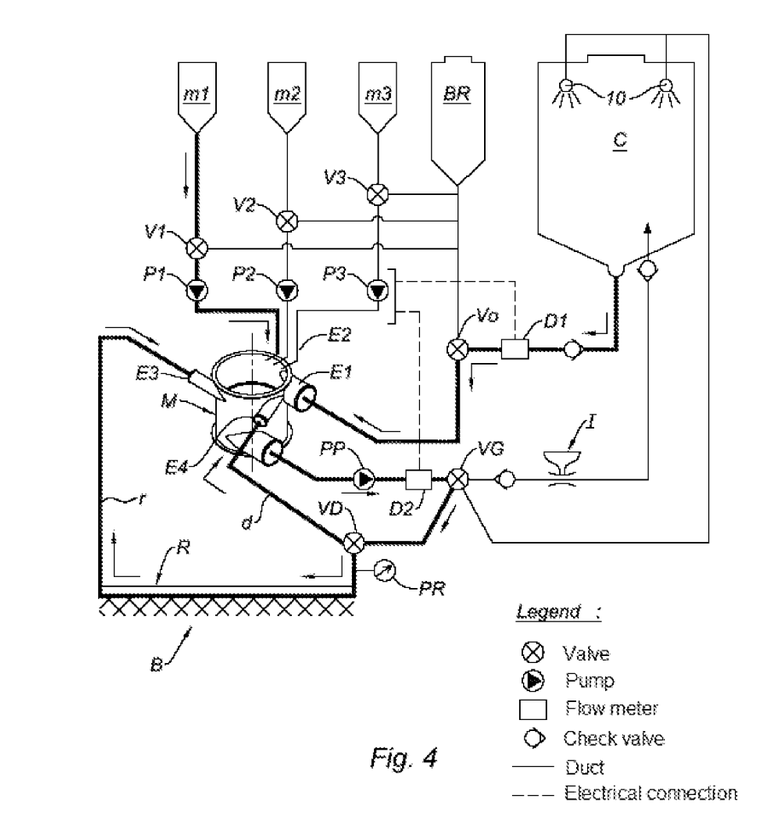

FIG. 4 corresponds to a spraying phase for treating a parcel of plants with the active substance m1.

The configuration of the spraying device differs from the previous configuration in that the main valve V0 is now adjusted so as to allow the circulation of the liquid (generally clean water or slurry) located inside the main tank C toward the inlet port E1 of the mixer M.

The metering pump P1 is driven electronically from information supplied by the flow meter D1, such that the correct metering of active substance m1 is obtained in the spray boom R, the nozzles B of which are in the open position, as shown in FIG. 4.

It should be noted that the supplementary active substance, injected by the metering pump P1, is directly proportional (anticipated dose) to the quantity of liquid coming from the tank C and reentering the mixer M through the inlet E1, and therefore also to the quantity of liquid sprayed by the nozzles of the boom, irrespective of the number of open nozzles. The metering therefore remains continuously the same as anticipated.

As is known in itself, the pressure of the liquid located inside the boom R should remain substantially proportional to the square of the traveling speed of the agricultural vehicle, so as to ensure a substantially constant volume per square meter of liquid sprayed by the open nozzles on the plants, i.e., an RPA (Rate Proportional to Advancement), knowing that the metering of active substance in the sprayed liquid always remains constant, owing to the present device.

To obtain such a pressure, measured by the pressure meter PR, one acts electrically on the regulating valve VD so as to bypass the necessary flow toward the bypass duct d, which returns to the mixer M through the (upper) inlet port E4.

When the agricultural vehicle travels at high speeds, which may reach up to 25 km/h or more, one cannot settle for acting on the pressure inside the boom R to ensure the correct metering of the sprayed phytosanitary products, as it becomes too high, since to go from 5 to 25 km/h, the pressure must be multiplied by 25.

That is why the device is for example provided with 3 speed variation ranges: low, medium and high, just as 4×4 vehicles have 2 or 3 speed ranges depending on the position of the transfer box.

We will for example call these three ranges: tortoise (4 to 10 km/h), normal (8 to 20 km/h), hare (12 to 30 km/h), making it possible to limit the pressure variation in each range to $(2.5)^2=6.25$ times only. The selected speed range should preferably be chosen before beginning to spray in a certain speed bracket.

The choice of one of these configurations automatically acts on the ratio between the rate of the metering pump P1 and the rate D2 from the tank C so as to obtain the correct desired metering (concentration).

In the hare scenario, the metering of m1 relative to D2 will be increased by 50% with respect to the normal metering, since the speed bracket is 50% higher than normal.

Conversely, in the tortoise scenario, it will be decreased by 50%, since the speed brackets are then half of the normal bracket.

It should be noted that it is preferable, before changing speed ranges, to redo (preferably automatically) a new (rapid) metering cycle of circulation circuit, as explained above.

It should also be noted that the return duct r returning toward the (upper) inlet port E3 of the mixer M makes it possible to limit the risks of sedimentation and clogging of the nozzles B of the boom R, as is known in itself.

Figure 5:
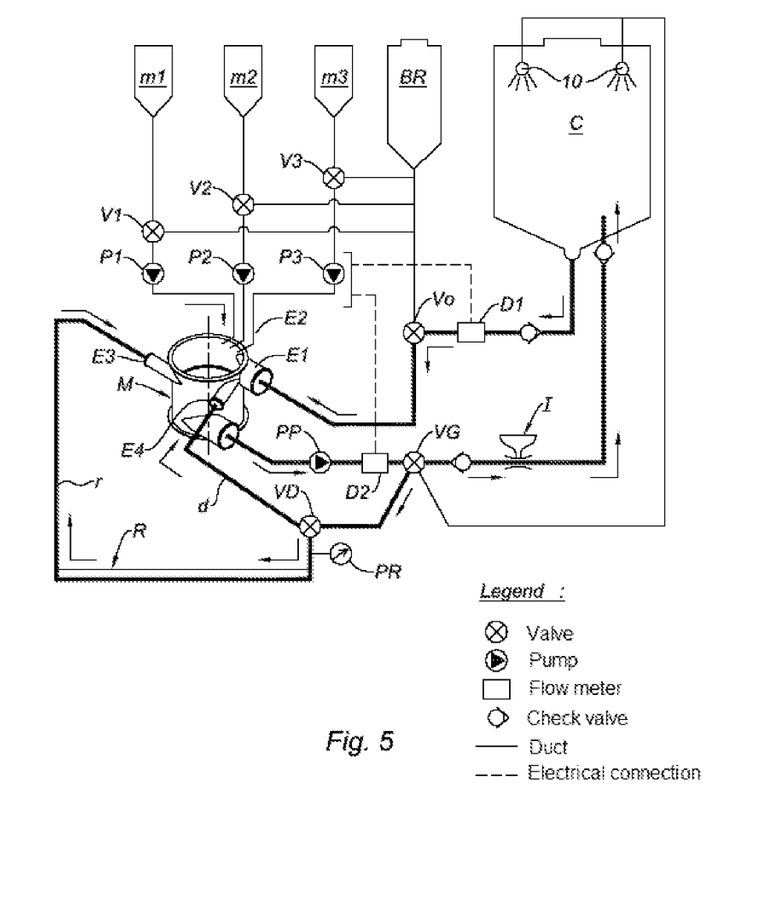

The configuration of the spraying device of FIG. 5 corresponds to a different phase for incorporating products, for example powders, using the incorporating device I.

This configuration differs from the previous configuration in that, during the incorporation of said product in the tank C, the stores of active substances m1, m2, m3 are switched off by closing the respective secondary valves V1, V2, V3, and in that the general valve VG is positioned so as to allow the liquid to return to the tank C by passing through the incorporation device I; the nozzles B and the boom R are also closed.

This configuration makes it possible to incorporate a phytosanitary product into the liquid located in the tank C, by introducing said product through the incorporating device I.

As is known in itself, this incorporating device I may be substantially in the form of a funnel topping a suction device of the Venturi type.

However, in the alternative of FIG. 5 for incorporating powdered products using the incorporator I, it is also possible to incorporate one or more liquid active substances (m1, m2, m3) into the tank C (simultaneously or independently), using the metering pumps (P1, P2, P3), driven by the flow meter D1 (as explained above), which ensures proper metering of the tank C. The advantage of this incorporation by the metering pumps (P1, P2, P3) is that it avoids any manual manipulation of the active substance cans, thereby eliminating any risk of contamination, metering error, damage during travel, and oxidation of tainted cans. The sprayer can then be used traditionally.

Once this incorporation is done, the circulation of the liquid in all of the ducts as indicated in FIG. 5 allows very quick and effective homogenization inside the tank C, the cyclone mixer M, and the entire circulation circuit.

Figure 6:
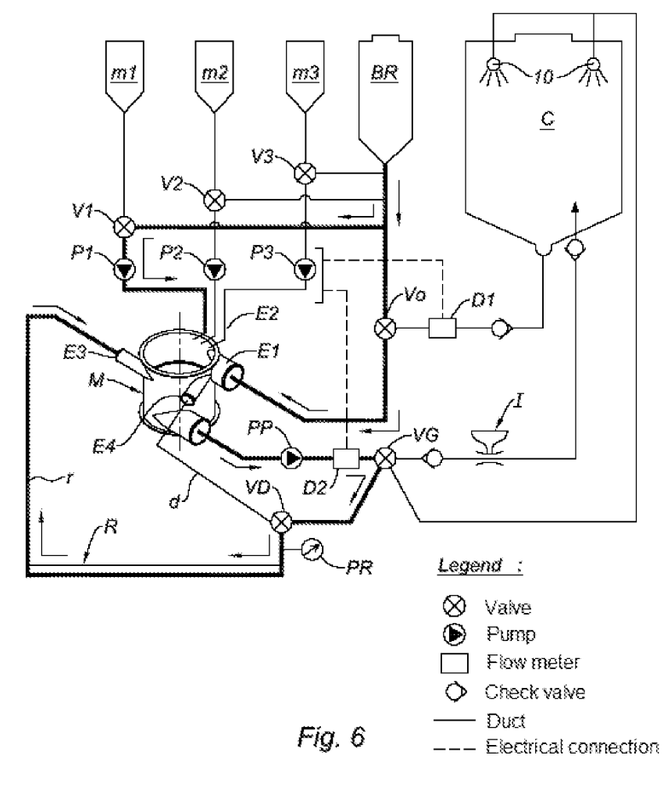

The configuration shown in FIG. 6 corresponds to a rinsing phase for rinsing the circuit after spraying the active substance m1.

In this rinsing phase, the tank C is isolated from the circuit through appropriate positioning of the main valves V0 and VG, and the secondary rinse valve V1 is placed so as to allow the rinse water located inside the can BR to be sucked up by the metering pump P1.

The operation of the main pump PP allows circulation of the rinse water in all of the ducts indicated in the thick lines in FIG. 6.

After such a circulation, the nozzles of the spray boom R are open so as to allow that water to be discharged.

Of course, the information provided above relative to rinsing of the active substance m1 is applicable mutatis mutandis to the active substances m2 and m3, by adjusting the respective secondary valves V2, V3, and starting the respective metering pumps V2 and V3.

Figure 7:
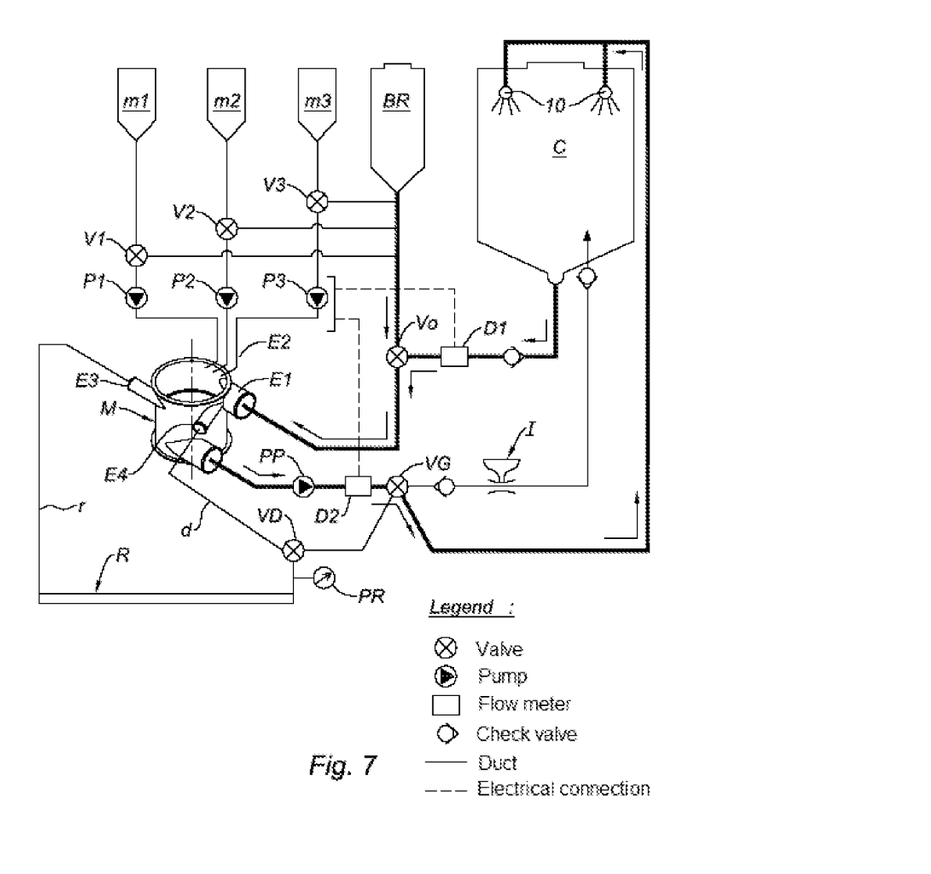

The configuration of FIG. 7 corresponds to a rinsing phase for rinsing the main tank C, at the end of a spraying run.

First, the valve V0 is oriented so as to allow the arrival from the can BR to the mixer M, via the inlet E1, of a sufficient quantity of water to perform the first rinsing of the tank C.

That valve V0 is then oriented to allow the pump PP to suck in the tank C, via the inlet E1 of the same mixer M. In parallel, the general valve VG is oriented so as to convey the liquid discharged by the main pump PP toward the rotary rinse jets 10 situated inside the tank C.

As can be understood in light of the preceding, the direct-injection spraying device according to the invention allows a very quick adjustment of the metering of active substances within the liquid to be sprayed, due to the considerable efficiency of the cyclone mixer M.

Based on its operating principle, such a mixer makes it possible to perform the various required homogenization operations practically instantaneously.

Furthermore, owing to its small size, such a mixer makes it possible to obtain a small slurry circuit and dead space, which increases the device's reactivity and limits the dead spaces to be cleaned in fine. All of these features make it possible to eliminate the overdosing or under-dosing problems observed in the state of the art, inherent to the inertia of the earlier systems whereof the RPA metering was done upon incorporating the active substance, proportionally to the variation of the traveling speed, causing the many inertial drawbacks explained above.

Furthermore, the cyclone mixer M is extremely simple and inexpensive to produce, and does not require any outside energy to operate.

Moreover, due to the simplicity of its shapes, this mixer is very easy to clean.

As will have been understood, the architecture of the device according to the invention makes it possible to prevent any active substances m1, m2, m3 from returning into the main tank C, said active substances reaching the spray boom R in a closed circuit through the mixer M, during the spraying phases.

This makes it possible to reduce the amounts of water needed to wash the entire facility considerably.

It is in particular possible to change active substances with very brief rinsing operations, using small quantities of water.

Of course, the present invention is not limited to the embodiment described and shown, which is provided as a mere example.

Figure 8:
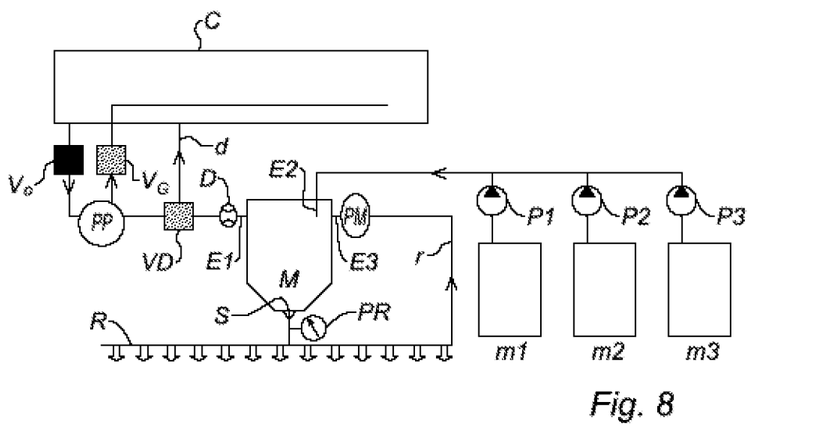
FIGS. 8 to 10 show two other possible embodiments of the present invention.

Thus for example, FIG. 8 shows another possible embodiment of the present invention: only the differences with respect to the embodiment previously described will be highlighted below, having noted that the same references are used to designate identical or similar members.

The bottom of the tank C communicates with a main rinse valve V0.

This main rinse valve V0 in turn communicates with a main pump PP, which itself communicates with a first upper inlet port E1 of the cyclone mixing device M that will be described later (see FIG. 9).

A general valve VG is inserted between the main pump PP and the tank C.

A flow (d) regulating bypass is connected to a regulating valve VD inserted between the main pump PP and the first inlet port E1.

A first flow meter D is inserted between the flow regulating valve VD and the first port E1 of the mixer M.

Several active substance stores, three in the illustrated example (m1, m2, m3), respectively communicate with three metering pumps P1, P2, P3.

These three metering pumps P1, P2, P3 in turn communicate with a second upper inlet port E2 of the mixer M, offset slightly downstream (for example, substantially by a quarter revolution) from the first inlet port E1, potentially protruding inside the mixer M, so as to penetrate the heart of the inlet flow E1 directly.

The cyclone mixer M also includes an outlet port S in its second (lower, in this case) portion with an axis either substantially tangent to the outbound direction of rotation (here trigonometric) of the cyclone, or perpendicular to the axis A of the mixer M (see detail in FIG. 2), or coaxial or parallel to that axis, so as to optimize the homogenization.

The outlet S in turn is connected to at least one spray boom R provided with at least one return duct (r) returning toward a third inlet port E3 arranged in the first (in this case, upper) portion of the mixer M, and offset by a quarter revolution relative to the second inlet port E2.

A pressure measuring device PR makes it possible to determine the pressure of the liquid located in the spray boom R.

A mixing pump PM is preferably provided in the return loop (r).

FIG. 2 more specifically shows that the cyclone mixer M can be made very simply using a cylinder 9 including the inlet ports E1, E2, E3 in its first (upper) portion and the outlet port S in its second (lower) portion, the terms "upper" and "lower" of course being used relative to the vertical once the mixer M is installed on the agricultural vehicle, with the understanding that these two terms and positions can be inverted.

As previously explained, the (upper) inlet ports are preferably offset by a quarter revolution relative to one another.

The inlet ports E1, E3 and the outlet port S are arranged substantially tangentially, in the direction of the inner flow (here trigonometric) relative to the cylinder 9 forming the body of the mixer M.

On the contrary, the inlet port E2 for the active substances m1, m2, m3 is preferably oriented in a direction substantially perpendicular to the axis A of the mixer M, and protruding substantially inward, so as to penetrate the heart of the flow entering through E1.

To incorporate an active substance m1 into the entire circulation circuit (the dead space of which is known by construction), for example, before a spraying phase, the following procedure is used.

The metering pump P1 is operated so as to send the active substance m1 inside the mixer M, through the second inlet port E2.

The main rinse valve V0 is opened and the general valve VG is closed.

The regulating valve VD is placed in the intermediate position between the bypass duct (d) and the first inlet port E1; the spray nozzles of the boom R are closed.

The main pump PP and the mixing pump PM are actuated, which results in mixing the active substance m1 arriving through the second inlet port E2 with other liquids arriving on the one hand from the duct of the tank C through the first port E1, and on the other hand through the return duct r through the third port E3.

The length of this incorporation and metering phase for the substance m1 may be determined from the knowledge of the volume of the circuit indicated in thick lines in FIG. 3: once this length is reached, the metering pump P1 is stopped, while continuing to rotate the main pump PP and the mixing pump PM, so as to complete the homogenization of all of the liquid circulating in that circuit.

We will now examine a spraying phase during which one wishes to treat a parcel of plants with the active substance m1.

The main valve V0 is adjusted so as to allow the circulation of the liquid (in general, clear water or slurry) located inside the main tank C toward the inlet port E1 of the mixer M.

The metering pump P1 is driven electronically from information supplied by the flow meter D, such that the correct metering of the active substance m1 is obtained in the spray boom R, the nozzles of which are in the open position.

It should be noted that the supplementary active substance, injected by the metering pump P1, is directly proportional (anticipated metering) to the quantity of liquid coming from the tank C and entering the mixer M through the inlet E1, and therefore also the quantity of liquid sprayed by the nozzles of the boom, irrespective of the number of open nozzles. The metering therefore remains continuously as anticipated.

As is known in itself, the pressure of the liquid found inside the ramp R should remain substantially proportional to the square of the traveling speed of the agricultural vehicle, so as to ensure a substantially constant volume per square meter of liquid sprayed through the open nozzles on the plants, i.e., an RPA (Rate Proportional to Advancement), with the understanding that the metering of the active substance in the sprayed liquid always remains constant, owing to the present device.

To obtain such a pressure, measured by the pressure meter PR, one acts electrically on the regulator valve VD so as to deflect the necessary flow toward the bypass duct d, which returns to the tank C.

To rinse the circuit after spraying the active substance m1, the valves V0 and VG are closed and the main pump PP and mixing pump PM are operated so as to circulate clear water from the tank C in all of the ducts.

After such a circulation, the nozzles of the spray boom R are opened so as to allow that water to be discharged.

Of course, the information provided above relative to rinsing of the active substance m1 is applicable mutatis mutandis to the active substances m2 and m3, by starting the respective metering pumps P2 and P3.

Figure 10:
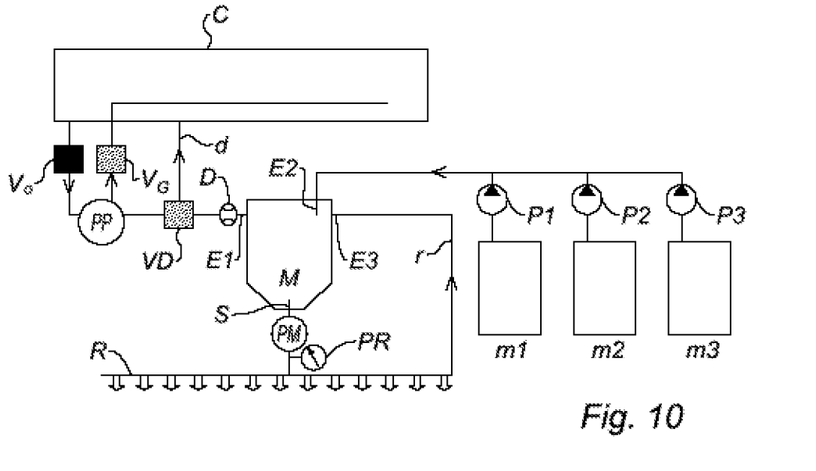

In the embodiment illustrated in FIG. 10, the mixing pump PM is placed just at the outlet S of the mixer M, upstream of the pressure probe PR and the spray boom R.

Figure 9:
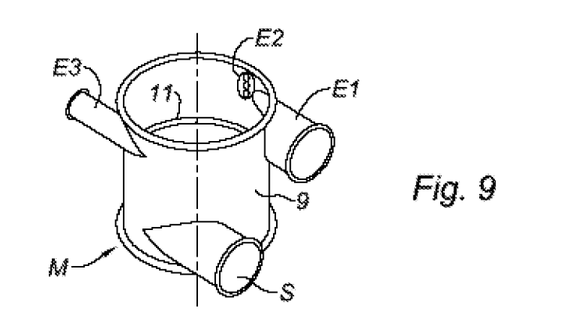

In the embodiments of FIGS. 8 to 10, placing the main pump PP and the regulating bypass (r) upstream of the cyclone mixer M makes it possible to prevent the fraction of liquid circulating in the bypass from passing through the cyclone mixer in a closed loop, in particular when the spraying is stopped, and thereby does not heat to boiling.

This arrangement of the main pump and the regulator bypass also makes it possible to place the cyclone mixer as close as possible to the spray boom, and thus to limit the dead spaces between the mixer and the boom, and therefore the reaction times needed to modify the composition of the mixture sprayed on the plants, in particular during variations in the speed of the agricultural vehicle.

The invention claimed is:

1. A direct-injection spraying device, in particular for an agricultural vehicle, comprising:
    a main tank,
    at least one spray boom,
    at least one active substance store,
    a cyclone mixer whereof a first portion comprises at least first and second substantially tangential inlet ports, and whereof a second portion comprises an outlet port, and a fluid circuit comprising:
    a main pump disposed upstream of the cyclone mixer,
    at least one inlet duct connecting said tank to said first port,
    at least one bypass controlling a flow rate in said boom in accordance with a traveling speed of said vehicle, the bypass being connected to a regulating valve inserted between the main pump and the first inlet port and being disposed upstream of the cyclone mixer, wherein the regulating valve is a three-way valve connected to the at least one spray boom,
    at least one metering pump inserted between said store of active substance and said second port, and
    at least one outlet duct connecting said outlet port to said boom,
    the device further comprising at least one timing means for timing the spraying so as to ensure a propagation of the new dose to the entire circuit before spraying, and three metering pumps that communicate with said second port and wherein said second port is offset downstream from said first inlet port, and protrudes into the cyclone mixer.

2. The device according to claim 1, further comprising a circulation return for returning the liquid in the boom toward the mixer, and wherein the mixer also includes a third inlet port capable of receiving the pressurized liquid coming from that return.

3. The device according to claim 1, wherein it can operate according to at least two speed ranges:
    a relatively slow range, in which the flow rate of the active substance coming from the active substance store is reduced relative to the liquid flow rate coming from the main tank, and
    a relatively fast range, in which the flow rate of active substance coming from the active substance store is increased relative to the flow rate of liquid coming from the main tank.

4. The device according to claim 1, further comprising a plurality of active substance stores connected to the second port by respective metering pumps.

5. The device according to claim 1, wherein the tank is associated with a flow meter measuring a quantity of liquid sucked from the main tank and capable of allowing the metering pumps to be driven accordingly.

6. The device according to claim 1, wherein the at least one timing means for timing the spraying is activated in particular upon a change in the metering by the metering pumps.

7. The device according to claim 1, wherein the main pump is inserted between the main tank and the first inlet port.

8. The device according to claim 1, wherein the outlet port of said mixer is oriented in a substantially coaxial direction substantially parallel to a longitudinal axis of the mixer.

9. The device according to claim 1, wherein said mixer assumes a shape comprising at least one of cylinders, cones and spheres.

10. The device according to claim 1, wherein said mixer comprises at least one inner lip arranged between its first and second portions.

11. The device according to claim 1, wherein said mixer comprises baffles or inner flaps able to favor rapid homogenization of various entering liquids.

12. An agricultural vehicle, comprising a spraying device according to claim 1.

13. The device according to claim 1, wherein the bottom of the main tank communicates with a main rinse valve.

14. The device according to claim 13, wherein the main rinse valve communicates with the main pump and the main pump communicates with the first inlet port.

* * * * *